US008964062B1

(12) United States Patent
Neglur

(10) Patent No.: US 8,964,062 B1
(45) Date of Patent: Feb. 24, 2015

(54) INTEGRATED LIGHT SENSOR FOR DYNAMIC EXPOSURE ADJUSTMENT

(71) Applicant: Amazon Technologies, Inc., Reno, NV (US)

(72) Inventor: Smita Neglur, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 58 days.

(21) Appl. No.: 13/718,691

(22) Filed: Dec. 18, 2012

(51) Int. Cl.
*H04N 5/225* (2006.01)
*H04N 5/235* (2006.01)

(52) U.S. Cl.
CPC .................................. *H04N 5/235* (2013.01)
USPC .................. 348/230.1; 348/234; 348/236

(58) Field of Classification Search
USPC ........................................ 348/236, 238, 262
See application file for complete search history.

(56) References Cited

U.S. PATENT DOCUMENTS

| | | | | |
|---|---|---|---|---|
| 2002/0025165 | A1* | 2/2002 | Higuchi | 396/429 |
| 2004/0041911 | A1* | 3/2004 | Odagiri et al. | 348/207.1 |
| 2004/0246348 | A1* | 12/2004 | Takeshita | 348/223.1 |
| 2005/0206750 | A1* | 9/2005 | Aoyagi et al. | 348/238 |
| 2009/0009606 | A1* | 1/2009 | Takeuchi | 348/169 |
| 2009/0102936 | A1* | 4/2009 | Muramatsu | 348/222.1 |
| 2009/0136224 | A1* | 5/2009 | Aoyagi | 396/157 |
| 2010/0296262 | A1* | 11/2010 | Kim et al. | 361/827 |

\* cited by examiner

*Primary Examiner* — Twyler Haskins
*Assistant Examiner* — Dwight C Tejano
(74) *Attorney, Agent, or Firm* — Novak Druce Connolly Bove & Quigg LLP

(57) ABSTRACT

The amount of resources needed to provide automatic exposure control (AEC) for a camera of a computing device, as well as the amount of latency required to determine an appropriate exposure setting for current conditions, can be improved utilizing an ambient light sensor (ALS) that is integrated with a camera module corresponding to the camera. The ALS can capture data regarding the amount of ambient light around the device, and a microprocessor or other component of the camera module can analyze the data using an AEC algorithm or other such process to determine one or more initial exposure settings for the camera. This process can be completed without sending image data to a host processor or other such component. Providing relatively accurate initial exposure settings can, in at least many situations, enable the AEC algorithm to more quickly converge to proper settings than is possible using conventional approaches.

22 Claims, 5 Drawing Sheets

INTEGRATED LIGHT SENSOR FOR DYNAMIC EXPOSURE ADJUSTMENT

BACKGROUND

People are increasingly utilizing portable computing devices for a variety of tasks. Some of these tasks involve the capture of one or more images, or video, using at least one camera of a computing device. In order to obtain images of an acceptable quality, such as images with appropriate levels of brightness or contrast, various computing devices can utilize an exposure control algorithm to attempt to adjust the exposure of the camera(s) capturing the image(s). In conventional approaches, the algorithm is executed on a main processor of the device, and several iterations can be necessary to get to an appropriate exposure setting for current conditions. The latency introduced by each iteration can degrade the user experience. Further, the amount of power and resources needed to determine the appropriate exposure setting can be a significant, which can be particularly undesirable for portable computing devices with limited battery life or processing capability.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to capturing images in an electronic environment. In particular, various approaches provide for the determination and updating of one or more exposure settings using an ambient light sensor integrated in a camera module with the camera that is to capture the image(s). In at least some embodiments, the ambient light sensor can be used to determine an amount and/or intensity of light around the computing device, at least in the direction of a field of view of the associated camera. An automatic exposure control (AEC) algorithm, or other such algorithm or process, can analyze this data using a microprocessor of the camera module, for example, to determine an initial exposure setting for the camera. Such an approach can provide an initial exposure setting that is based upon current conditions, enabling the AEC algorithm to reach convergence faster than for conventional approaches, and reducing the latency to the first useable frame of data. The process can continue during a period where the camera is active, in order to adjust the exposure setting using components of the camera module, thus reducing latency for the adjustments and reducing the amount of power and/or processing needed to maintain a relatively accurate exposure setting under varying conditions.

Various other applications, processes and uses are presented below with respect to the various embodiments.

Figure 1:
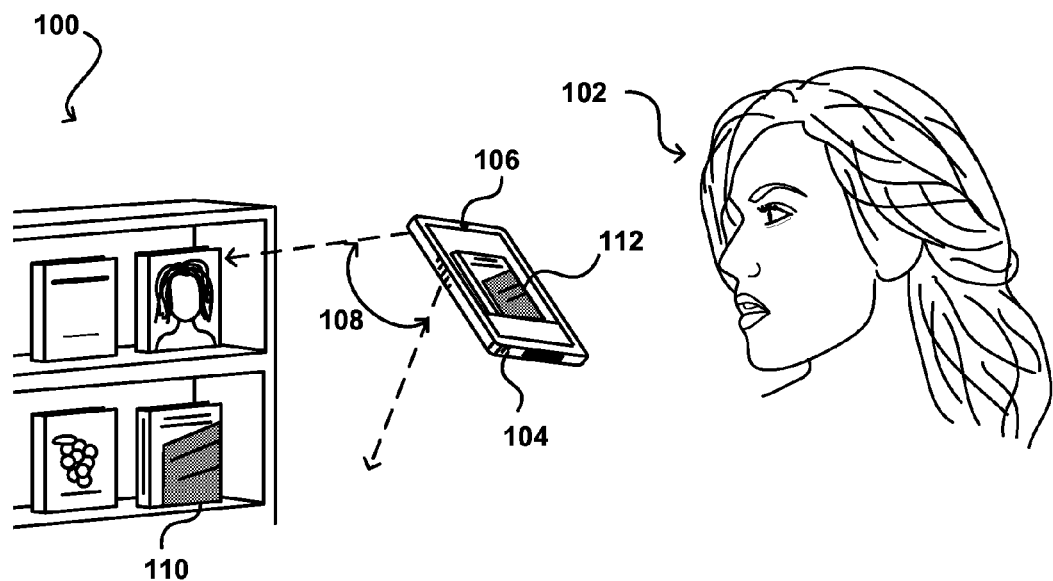
FIG. 1 illustrates an example of a user using a camera of a portable computing device to capture an image in accordance with various embodiments.

FIG. 1 illustrates an example environment 100 in which aspects of the various embodiments can be implemented. In this example, a user 102 is in a location that has a collection of books, and the user is interested in obtaining information about a particular book 110. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, and portable media players, among others.

In this example, a camera 106 on the device 104 can capture image information including the book 110 of interest, and at least a portion of the image can be displayed on a display screen 112 of the computing device. In order to obtain information about the book, at least a portion of the image information can be analyzed and, upon a match being located, identifying information can be displayed back to the user via the display screen 112 of the computing device 104. In order for an image analysis algorithm or image matching process to identify the book, however, there must be an acceptable level of quality in the image that enables the process to locate unique features or distinctive points in the image. The level of quality can include image characteristics such as brightness and contrast within a determined range, among other characteristics and values known or used for such purposes. Even if the user is not interested in obtaining information about the item and wants to capture an image of the book for another reason, the user likely will want the image to have acceptable image quality.

Figure 2:
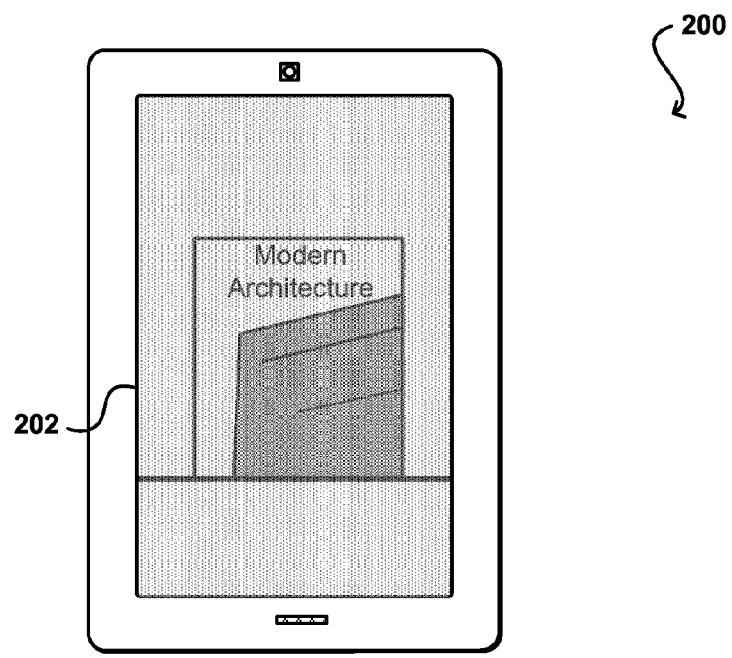
FIG. 2 illustrates an example image that can be captured with an inaccurate exposure setting.

As an example, FIG. 2 illustrates an example of a computing device 200 displaying an image of the book on a display screen, where the image quality likely would have one or more characteristics outside a desired range, or would otherwise have an unacceptable level of quality. In this example, the image likely is not bright enough for various purposes and lacks sufficient contrast. If such an image is provided to an object recognition algorithm, for example, the algorithm might not be able to identify enough key features to enable the book to be identified from the image.

One way to improve the quality of an image captured by the camera of the computing device would be to adjust one or more exposure settings for the camera. In digital imaging, for example, exposure generally relates to the amount of light that is directed and/or received to a unit area of a camera sensor for a single image. Exposure is typically measured in lux seconds, and the settings for controlling the exposure often include the amount of time that a shutter (physical or virtual) is open, or the amount of time during which each pixel of a camera sensor can capture light for a frame or single image. Other factors can influence exposure as well, such as the size of an aperture (which can be variable), the use of one or more filters, the ISO setting (where available), sensor sensitivity, etc. Automatic exposure algorithms typically use a value such as the average mid-tone value of an image captured by the camera to determine one or more appropriate exposure settings for the camera, where the mid-tone value is to be within an allowable range from a target mid-tone value, or have another determined and/or acceptable value. Different cameras can adjust exposure using different settings or combinations of settings, such as by adjusting an aperture size, adjusting an actual or effective shutter speed, etc.

Oftentimes software (or hardware) on the device will enable a user to manually adjust the exposure setting(s) to obtain an image with an acceptable level of quality. In many cases, the user can see the general effect of the exposure settings on a live video feed captured by the camera in order to determine the appropriate setting(s). For many users and situations, however, it may be undesirable to have to manually adjust the exposure settings for the camera, among other such settings, in order to obtain an acceptable image. Many users would like to be able to "point and shoot" or otherwise press a single button or provide a single input to obtain an acceptable image in most cases.

Conventional computing devices have implemented and/or utilized hardware and/or software components to attempt to automatically determine appropriate exposure settings for current conditions, as may include the amount of ambient light, information about objects within a field of view of the camera, or other such information. One such approach involves utilizing an automatic exposure control (AEC) algorithm to attempt to determine an appropriate exposure setting for current conditions. The AEC algorithm can be implemented in hardware and/or software, and can be in communication with, or can receive data from, a camera in order to analyze one or more aspects of an image captured by the camera. In some devices, image data captured by the camera will be fed to the AEC algorithm, which can attempt to determine a value such as the average illumination or mid-tone value in the camera, as may be determined by an average pixel value or average intensity value (e.g., from 0 to 1, or 0-255 for 8-bit color), the number of pixels having less than a threshold intensity value (e.g., under 10 where 0 corresponds to black), etc. The algorithm can start at a black level, or zero exposure setting, for example, and attempt to adjust the exposure setting of the camera in order to have the average intensity value within a certain range (e.g., 0.3 to 0.7, or from 100 to 200, for example). To increase the average brightness or intensity of the image, at least one exposure setting can be adjusted (e.g., increase the aperture size or lengthen the shutter speed) such that the camera captures a subsequent image having a greater level of exposure, such as to attempt to have the mid-tone value within an allowable range. To decrease the average brightness or intensity, one or more exposure settings can be adjusted to decrease the amount of exposure, such as by reducing the aperture size or increasing the shutter speed to cause less light to be captured by each pixel. In some examples, the adjustment involves iteratively adjusting the exposure settings and analyzing the resulting image data to get within the desired image quality parameters, such as to have the mid-tone value, average pixel value, average intensity value, or other such parameter(s) within a desired or target range. In digital image, each pixel can determine a pixel value for an image, where that pixel value is generally a number indicating a brightness and/or color for that pixel in the image. For example, in grayscale images the pixel values represent the brightness of each pixel, while for color images where each value is an 8-bit integer the pixel values have color values between 0 and 255. In some embodiments the pixels will each have three or more color values for different color components (e.g., red, green, and blue). In at least some embodiments an acceptable range for an image quality parameter can have a lower bound and an upper bound, while in other embodiments the range might be above, below, or at a specified value, among other such options.

In conventional devices, each iteration can involve transferring a large amount of image data over a high bandwidth image bus, such as a CIS (CMOS Image Sensor) or MIPI (Mobile Industry Processor Interface) bus, to an application processor, host processor, or other such component for analysis. The processor can utilize the algorithm to analyze the data and determine the improved exposure settings to provide to the camera, or a camera controller, etc. This process can thus consume a significant amount of resources and consume a significant amount of power, in addition to providing a source of latency for image capture as the appropriate exposure settings are determined and then applied. The latency and consumption issues are exacerbated when multiple iterations are needed to determine appropriate exposure values, or at least have the intensity, brightness, or other quality aspect(s) converge to an acceptable value. Different algorithms can utilize different thresholds or values that cause large or small adjustments in exposure settings with each iteration, which then can determine at least in part the number of necessary iterations.

Approaches in accordance with various embodiments can provide lower latency, reduced resource and power consumption, and other such advantages by taking advantage of an ambient light sensor (ALS) or other such component embedded in the camera, camera module, or image signal processor (ISP), for example, to determine an initial exposure setting for current conditions that enables a more rapid convergence of image settings and/or quality values. By providing an AEC algorithm with a better initial baseline, for example, the amount of latency introduced by an auto-exposure process can be significantly reduced. Such an approach can be particularly advantageous for applications that operate in varying light conditions, such as in low light, bright light, indoor, outdoor, sunny, and/or rainy conditions, among others.

Figure 3:
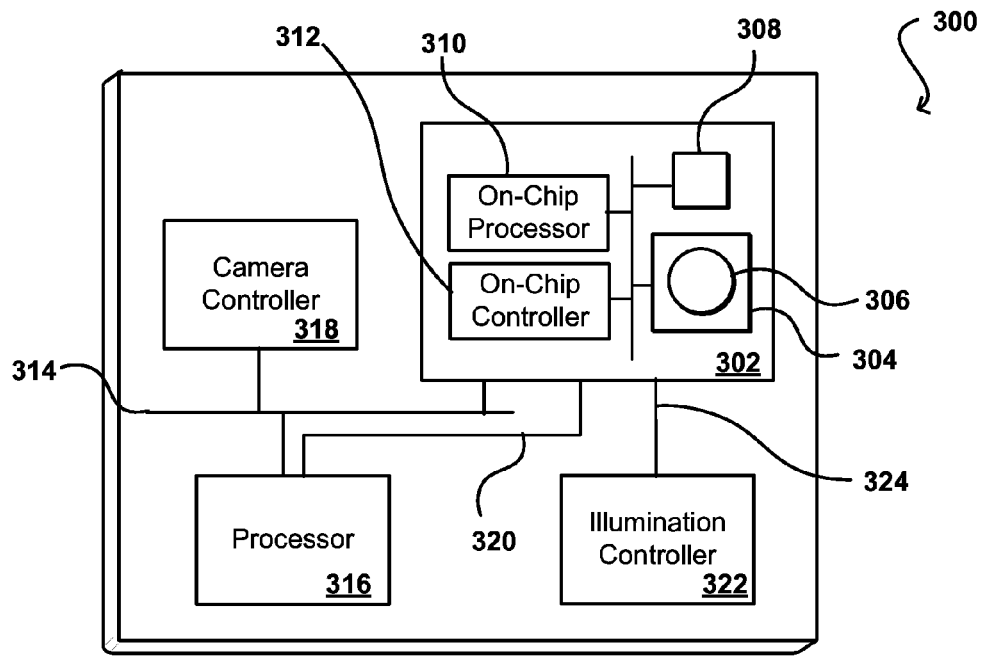
FIG. 3 illustrates an example configuration of components that can be used to dynamically adjust exposure settings for a camera in accordance with various embodiments.

FIG. 3 illustrates an example configuration 300 of components of a computing device that can be utilized in accordance with various embodiments. This example device includes at least one camera module 302, which can be implemented on a dedicated chip, circuit board, flex, or other such component in at least some embodiments. The camera module includes a camera sensor 304, such as a CMOS or CCD camera sensor, among other such options. As known for such purposes, the camera can include one or more camera elements 306, such as lenses, optical filters, and adjustable shutters. The camera sensor and shutter can be controlled locally using an on-chip processor 310, such as a relatively low power microprocessor. In at least some embodiments, the on-chip processor 310 can communicate with an on-chip camera controller 312, or other such component, for operating or adjusting the camera, shutter, and other such components. The camera module 302 also includes a dedicated and/or on-chip ambient light sensor (ALS) 308, which can be connected to the on-chip processor 310 and/or controller 312 over a relatively low bandwidth bus, such as a serial control bus like an I²C bus, SPI (Serial Peripheral Interface) bus, or SD (secure digital) bus. A relatively low speed or low bandwidth bus can be used instead of a high bandwidth image bus since the ALS will typically only have one pixel, or a relatively small number of pixels, such that very little data needs to be transmitted from the ALS to the local processor 310.

The ALS 308, which can be a single value photo-detector or photodiode, for example, can capture ambient light entering the ALS and convert the light into a current or voltage, which then can be used to determine a relative amount of ambient light near the device. Since the ALS is in the same module with the camera the ALS will capture ambient light in a direction that is substantially similar to the field of view of the camera, which can provide a more accurate determination than a sensor or camera positioned elsewhere on the device. The light or intensity data from the ALS can be analyzed by the on-chip processor 310 using an AEC or other such algorithm, and the on-chip processor can then contact the on-chip controller 312 to adjust the exposure setting of the camera 304 to the value determined by the on-chip processor. Since the amount of data to be analyzed is relatively small and the components are all located on the camera chip, in this example, the amount of latency for the initial determination is relatively small.

In some embodiments the camera module may only be active at certain times, such as when a user or application has indicated that the camera module should be active or the device should be in an image capture mode, etc. In such cases, the camera module 302 might receive a wake-up or activation signal from an application or host processor 316 of the device, a camera controller 318, or another such component. Before activating the camera sensor 304, the on-chip processor 310 and/or controller 312 can work with the ALS to cause the ALS to capture information about the amount of ambient light and provide that information for analysis. The on-chip processor 310, such as a low power PIC-class (micro)processor, can analyze that information using the AEC algorithm and determine a first exposure setting for the camera based at least in part upon the information from the ALS. The processor 310 then can work with the on-chip controller 312 to set the initial exposure setting for the camera. The exposure settings can be determined first in at least some embodiments, then the camera can be activated with the initial exposure settings determined for current conditions. Such an approach enables the image data captured by the camera to be closer to having the desired image quality values, in many cases, than when the camera starts with a default or programmed exposure setting and has to go through one or more iterations to reach a similar state, which can consume additional resources and come with additional latency. If the initial settings are not sufficient, the AEC algorithm can iterate over the data until the appropriate image quality values are determined, which when starting with a relatively accurate base can take significantly less time than conventional approaches. If sufficient image quality cannot be obtained through exposure settings, for example, the on-chip processor can contact an illumination controller 322 or other such component that can cause a source of illumination, such as a white light LED, to emit light that, upon reflection, can increase the brightness and contrast of the captured image. The exposure settings might need to be updated to reflect the illumination, and in some embodiments the illumination might be activated before image capture in order to allow the ALS and AEC components to determine appropriate exposure settings with the illumination, in order to provide a more accurate baseline for the current conditions with illumination. In some embodiments, a gain setting or other parameter value for the camera might be adjusted in order to improve the quality of the captured image data, with the illumination being utilized when such adjustments are not sufficient to provide adequate image quality parameter values. The gain of a camera such as a CCD camera is the conversion between the number of electrons recorded by the CCD and the number of units or counts contained in the CCD image, which represents the magnitude of amplification a given camera subsystem will produce. The gain can be adjusted to obtain additional photons or sensitivity, for example, which can improve image quality without providing additional illumination, which can save energy for at least some applications.

The ALS can also be used in at least some embodiments to adjust the exposure settings based on changes in the amount of ambient light. While the image data can still be analyzed as before in at least some embodiments, certain embodiments can attempt to update the exposure values using the ALS and on-chip processor, in order to minimize the amount of power and resources needed to maintain appropriate image quality. An ALS might continually, periodically, or at other times capture light data to attempt to determine whether the amount of detected ambient light has changed more than a threshold amount, and if so the on-chip processor can determine new exposure parameters to use with the local camera 304 for subsequent image capture. The thresholds or amounts can be configurable and can vary by user, device, or application, and the maximum frequency with which exposure settings can be adjusted can also vary or be configurable within the scope of the various embodiments. In some embodiments, the rate at which exposure settings are updated can be based at least in part upon an activity or function that is active on the computing device. For example, in a video chat or capture mode where video is continually being captured and/or transmitted the exposure settings might be updated frequently, where for a game where the camera might be used only periodically to capture images the determination might be made less frequently, only when an image is to be captured, or when the context of the device changes such that image capture is likely, such as when a user moves a device to cause the device to be positioned in an orientation indicative of image capture, such as the device being substantially vertical as determined by a compass or inertial sensor, for example, and/or being positioned relative to the user's face, as may be determined using a camera or other such sensor. Various other situations can trigger a determination as well within the scope of the various embodiments. Further, other configurations are possible as well, such as where one or more components such as the camera controller 318, host processor 316, and/or illumination controller 322 are on the same die, chip, or substrate, or part of the same package, as the camera 304, ALS 308, and other on-chip components.

Figure 4:
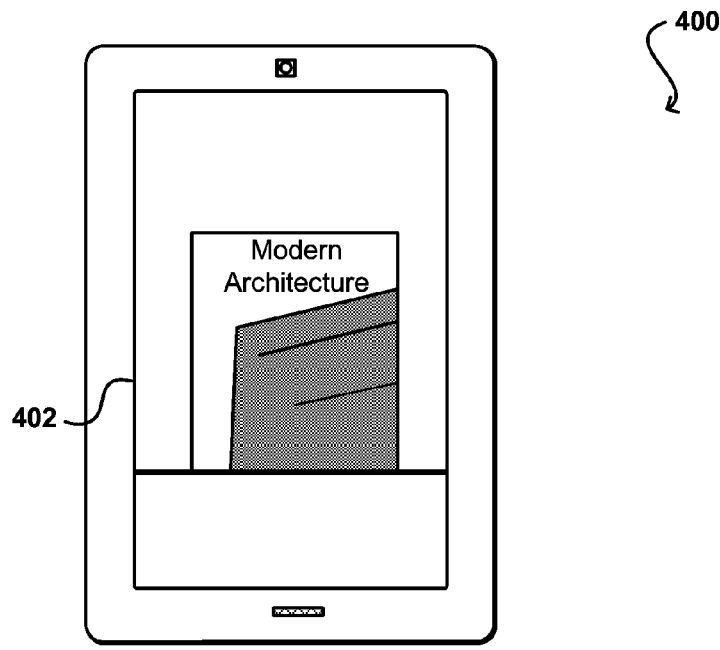
FIG. 4 illustrates an example image captured with previously-determined exposure settings in accordance with various embodiments.

FIG. 4 illustrates an example image 400 that can be captured using exposure settings determined using a process such as those discussed herein. As illustrated, the brightness and contrast levels are such that a user might be satisfied with the image quality, or an algorithm might be able to locate feature points useful for object recognition, among other such possibilities. While the exposure settings might need to be adjusted to meet specific targets or ranges based on the captured image data, the initial image quality can be such that the adjustments will take less time and resources (at least on average) than if the process had started with a default setting that did not correspond to current conditions.

Figure 5:
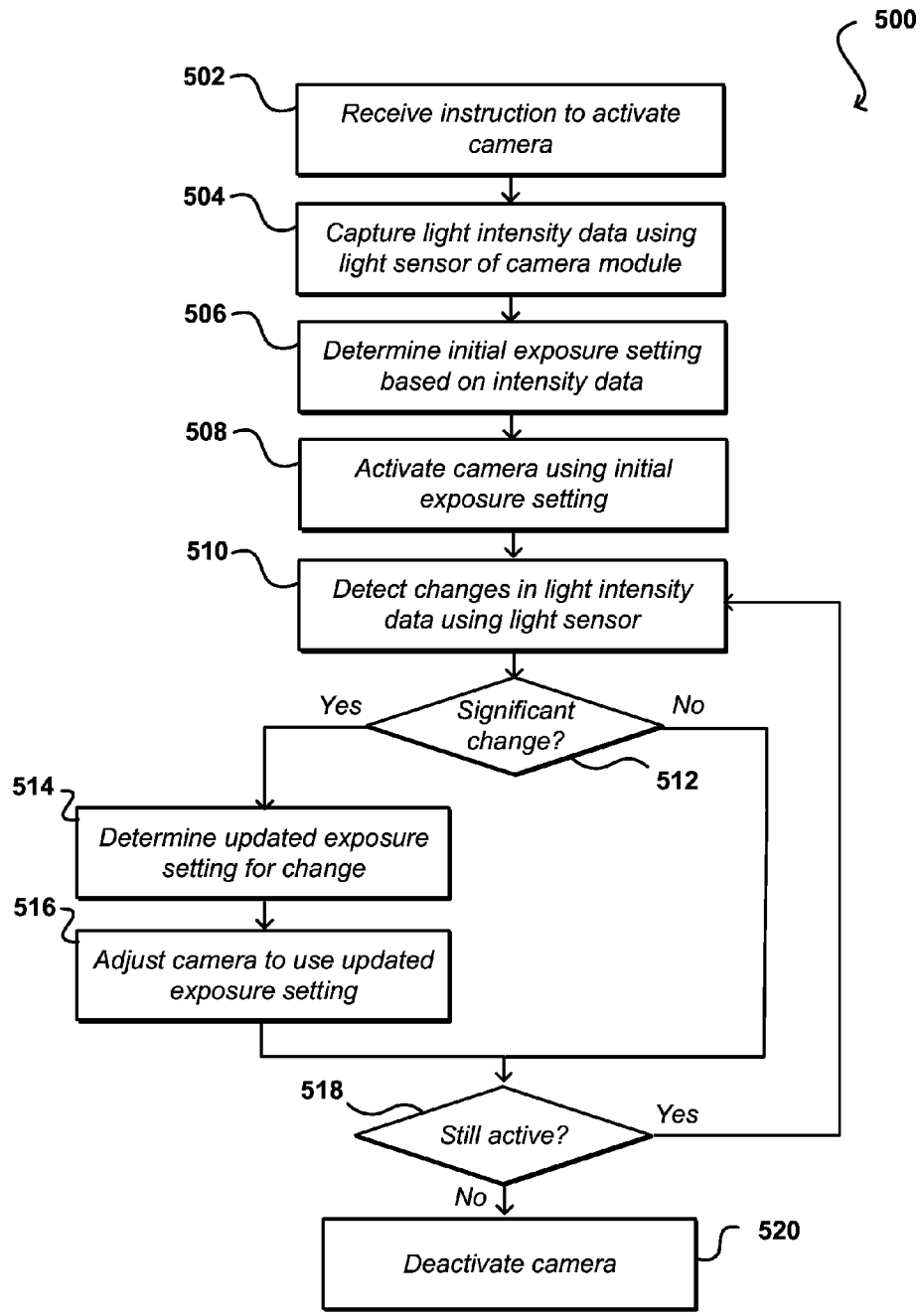
FIG. 5 illustrates an example process for dynamically adjusting exposure settings for a camera module that can be used in accordance with various embodiments.

FIG. 5 illustrates an example process 500 for determining exposure settings for a camera of a computing device that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, an instruction to activate the camera is received 502 on the computing device, where that instruction can be generated by an entity or component such as a user, an application, a remote device, and the like. In some embodiments, the camera might already be active but the instruction causes the camera to enter a "ready" mode or other such state. Light intensity information can be captured 504 by an ambient light sensor of a computing module corresponding to the camera to be activated. The light intensity information can be fed to a processing component such as a microprocessor of the camera module, and an initial exposure setting for the camera can be determined 506 based at least in part upon analyzing the intensity data using an automatic exposure control (AEC) algorithm as discussed or suggested herein. The camera then can be activated 508 using the initial exposure settings. As discussed, some additional iterations of the AEC algorithm might be needed in some situations to get one or more image quality parameters within a specified range, but the time and resources necessary for the adjustment can be significantly less than for conventional approaches.

While the camera and/or camera module are active, the ALS can continue to capture light intensity data that can be analyzed to detect 510 changes in the amount and/or intensity of ambient light proximate the device. In at least some embodiments the change can be analyzed 512 to determine whether the amount of change in ambient light was sufficient (e.g., met or exceeded a change threshold) to warrant adjusting the exposure parameters. If not, and the camera or camera module is to remain active 514, the monitoring of the amount of ambient light can continue. If the change in ambient light is sufficient to warrant an exposure value update, the change in intensity value and/or the most recently detected intensity value can be analyzed using the AEC algorithm to determine 514 an adjusted exposure setting for the camera. The camera settings then can be adjusted 516 to reflect the new exposure value, and as long as the camera or camera module is to remain active 518, the monitoring of the amount of ambient light can continue. At any point during this process, the camera sensor can be caused to capture information in response to an instruction, request, or call, and that information can be transferred, processed, and/or stored using any suitable approach known or used for such purposes. Once the camera module is no longer remain active, such as upon reaching a timeout value or receiving an instruction, the camera and/or camera module can be deactivated 520. In at least some embodiments, the ALS of the camera module will not capture light intensity data for analysis until the camera module is again activated.

In some embodiments, the values or targets might vary based on any of a number of different factors. For example, if it is daytime or night time the device might utilize different intensity or brightness targets. Similarly, a device that determines it is likely outside or in bright sunlight might use a different target than a device that is inside. A device can use information such as time, location from a GPS, light from one or more light sensors, input from a user or application, or other information to update or adjust the thresholds or targets as appropriate.

Certain computing devices might include multiple cameras. In some embodiments, each camera can have an associated ALS and can make a separate exposure determination. In other embodiments, one or more light sensors might be shared among two or more cameras, and the intensity and/or exposure information might be used as a starting point for each of those cameras. The intensity information from an ALS can be used for other purposes as well, such as to determine a likely change in proximity of an object based at least in part upon the change in ambient light captured by the device.

Figure 6:
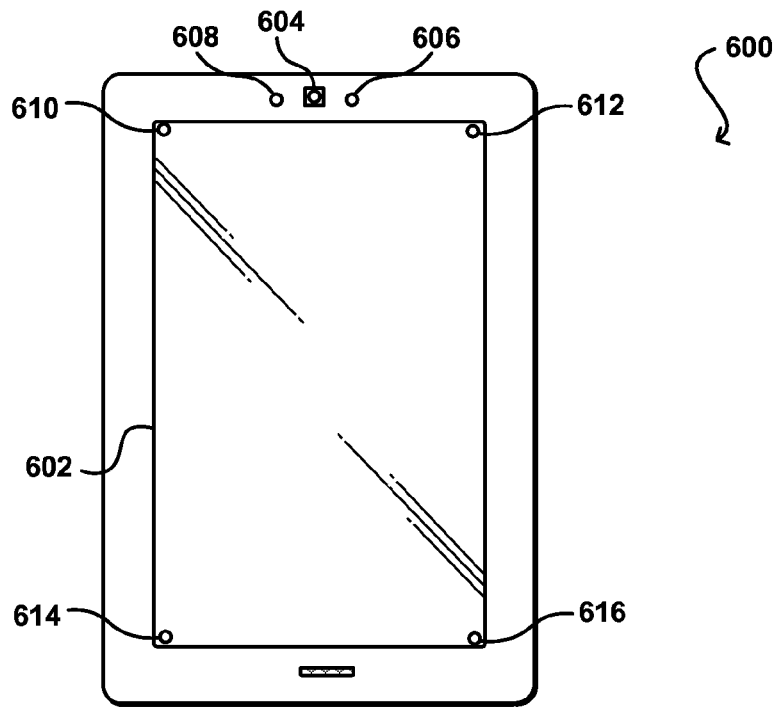
FIG. 6 illustrates an example computing device that can be utilized in accordance with various embodiments.

FIG. 6 illustrates an example computing device 600 that can be used in accordance with various embodiments. In this example, the device has a conventional, "front facing" digital camera 604 on a same side of the device as a display element 602, enabling the device to capture image information about a user of the device during typical operation where the user is at least partially in front of the display element. In addition, there can be additional cameras or sensors 210, 212, 214, 216 positioned at other appropriate locations on the computing device. It should be understood that there can be additional cameras, sensors, or other such elements on the same or other sides or locations of the device as well within the scope of the various embodiments, such as may enable image input from any desired direction or location with respect to the device. This example device also illustrates additional elements that can be used as discussed later herein, including an ambient light sensor 206 for determining an amount of light in a general direction of an image to be captured and an illumination element 208, such as a white light emitting diode (LED) or infrared (IR) emitter as will be discussed later herein, for providing illumination in a particular range of directions when, for example, there is insufficient ambient light determined by the light sensor. As discussed, in at least some embodiments the light sensor 608 and/or illumination element 606 can be included on a chip or board with the camera in a camera module or other such component. Various other elements and combinations of elements can be used as well within the scope of the various embodiments as should be apparent in light of the teachings and suggestions contained herein.

Figure 7:
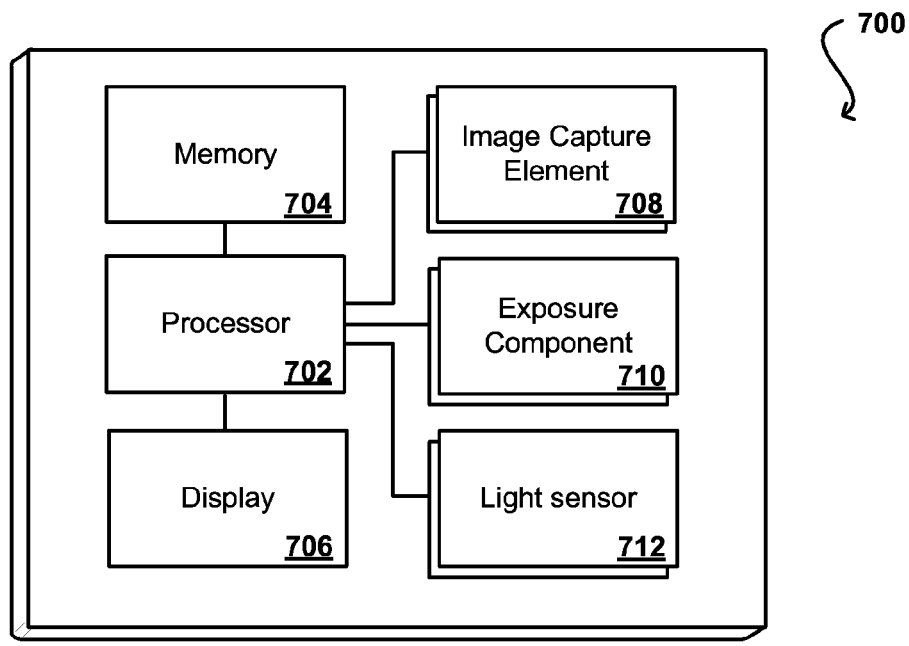
FIG. 7 illustrates example components of a device such as that illustrated in FIG. 6.

In order to provide various functionality described herein, FIG. 7 illustrates an example set of basic components of a computing device 700, such as the device 104 described with respect to FIG. 1. In this example, the device includes at least one central processor 702 (e.g., an application processor or host processor) for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc. The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 708, such as one or more cameras that are able to capture images and/or video of a user, people, or objects in the vicinity of the device. The device can also include, separately or as part of a camera module with at least one of the image capture elements 708, at least one light sensor 712, such as a photodiode capable of measuring intensity of light over at least a portion of the visible spectrum. The camera module can also include at least one exposure determining component 710, such as a local microprocessor and/or microcontroller. The exposure determining component(s) can include code that can be executed to analyze intensity data from a local light sensor 712 and use an automatic exposure control algorithm or other such approach to determining an appropriate exposure setting or at least one of the image capture elements 708. An image capture element can include, or be based at least in part upon any appropriate technology, such as a CCD or CMOS image capture element having a determined resolution, focal range, viewable area, and capture rate. The device can also include at least one lighting element (as illustrated in FIG. 6), as may include one or more illumination elements (e.g., LEDs or flash lamps) for providing illumination and/or one or more light sensors for detecting ambient light or intensity. Each illumination element can be operated by at least one of the device processor 702 or a local exposure determining component 710, such as a microprocessor of the same camera module.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 8:
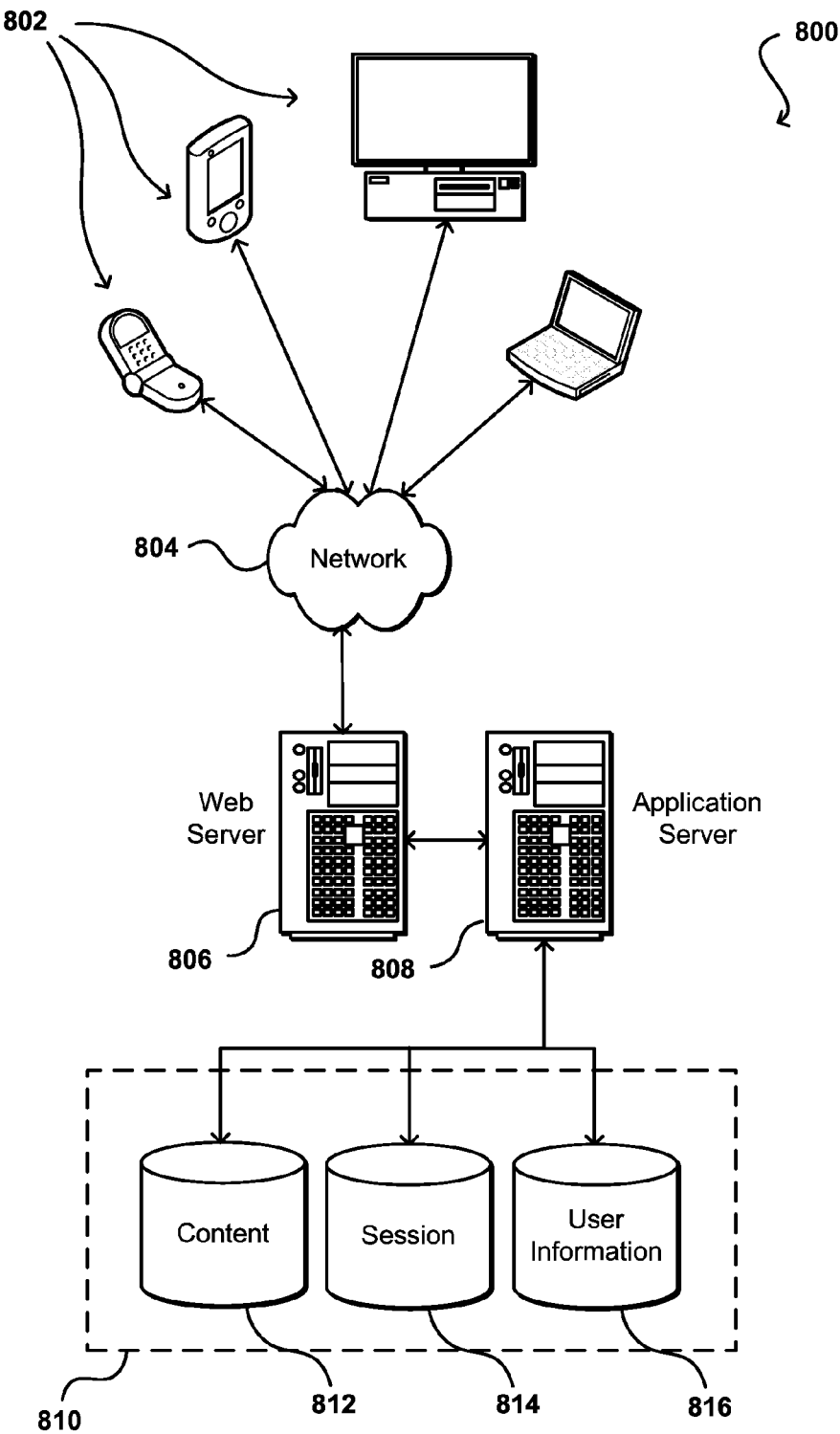
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a first processor;
    a camera module including:
        a camera configured to capture first image data,
        a camera controller configured to control at least an exposure setting of the camera,
        an ambient light sensor configured to detect an intensity of ambient light proximate the computing device,
        a second processor configured to receive data regarding the intensity of ambient light from the ambient light sensor and analyze the data using an automatic exposure control algorithm, the second processor configured to utilize a result from the automatic exposure control algorithm to determine an initial exposure setting for the camera, the second processor further configured to provide an instruction to the camera controller to apply the initial exposure setting; and
    memory storing instructions that, when executed by the first processor, cause the computing device to:
        capture second image data using the camera with the initial exposure setting,
        determine at least one image parameter value for the second image data,
        determine that the at least one image parameter value is outside an allowable range, and
        execute the automatic exposure control algorithm using at least one of the first processor or the second processor to determine an updated exposure setting for the camera.

2. The computing device of claim 1, further comprising:
memory storing instructions that, when executed by the first processor, cause the computing device to:
capture an image using the camera with the initial exposure setting;
determine at least one image parameter value for the image; and
execute the automatic exposure control algorithm using at least one of the first processor or the second processor to determine an updated exposure setting for the camera when the at least one image parameter value falls outside an allowable range.

3. The computing device of claim 2, wherein the instructions when executed by the first processor further cause the computing device to send an activation signal to activate the camera for image capture.

4. The computing device of claim 2, wherein the at least one image parameter value includes at least one of a brightness value, a contrast value, an average intensity value, an average pixel value, an image quality value, a mid-tone value, or a combination thereof.

5. A camera subsystem for a computing device, comprising:
a camera configured to capture first image data;
a light sensor configured to determine an amount of light proximate the camera subsystem;
a subsystem processor; and
memory including instructions that, when executed by the subsystem processor, causes the camera subsystem to:
cause the light sensor to capture intensity data regarding an amount of light proximate the camera subsystem,
cause the subsystem processor to analyze the intensity data to determine an initial exposure setting for the camera,
cause the camera to utilize the initial exposure setting,
cause the camera to capture second image data,
determine at least one image parameter value for the second image data,
determine that the at least one image parameter value for the second image data is outside an allowable range, and
determine updated intensity data.

6. The camera subsystem of claim 5, wherein the camera subsystem is installed in the computing device, the computing device including at least one host processor.

7. The camera subsystem of claim 6, wherein at least one of the host processor or the subsystem processor is configured to determine whether an updated exposure setting is to be applied to the camera in order for at least one image parameter value to be within an allowable range of values.

8. The camera subsystem of claim 6, wherein the initial exposure setting is determined by the subsystem processor without contacting the host processor.

9. The camera subsystem of claim 5, wherein the instructions when executed further cause the camera subsystem to:
cause the subsystem processor to at least periodically analyze intensity data from the light sensor and determine at least one updated exposure setting in response to a change in the intensity data.

10. The camera subsystem of claim 5, further comprising:
a camera controller configured to receive the initial exposure setting from the subsystem processor and cause the camera to use the initial exposure setting.

11. The camera subsystem of claim 5, wherein the subsystem processor determines the initial exposure setting using an automatic exposure control algorithm.

12. The camera subsystem of claim 5, further comprising:
a subsystem substrate, wherein the camera, the light sensor, and the subsystem processor are attached to the subsystem substrate.

13. The camera subsystem of claim 5, wherein the instructions when executed further cause the camera subsystem to:
provide at least one of the initial exposure setting or the intensity data for use with at least one other camera of the computing device.

14. The camera subsystem of claim 5, wherein the instructions when executed further cause the camera subsystem to:
cause an illumination element of the computing device to activate in order to enable at least one image parameter value to be within an allowable range of values.

15. The camera subsystem of claim 14, wherein the instructions when executed further cause the camera subsystem to:
adjust a gain value for the camera to attempt to bring the least one image parameter value to within the allowable range of values before causing the illumination element to activate.

16. A computer-implemented method, comprising:
capturing, using a light sensor of a camera module, intensity data regarding an amount of ambient light proximate the camera module;
analyzing, using a first processor of the camera module, the intensity data to determine an initial exposure setting for a camera of the camera module;
activating the camera using the initial exposure setting;
capturing a first image using the camera with the initial exposure setting;
providing data for the first image to a second processor of a computing device, the computing device including the camera module;
capturing a second image using the camera;
determining at least one image parameter for the second image; and
determining, using the first processor, that the at least one image parameter value for the second image is outside an allowable range; and
determining updated intensity data using the first processor of the camera module.

17. The computer-implemented method of claim 16, further comprising:
causing the second processor to analyze the image to determine whether at least one image quality value is within an allowable value range; and
receiving an updated exposure value from the second processor when the at least one image quality value is outside the allowable value range.

18. The computer-implemented method of claim 16, further comprising:
periodically analyzing, using the first processor, the intensity data to determine at least one updated exposure setting.

19. The computer-implemented method of claim 16, further comprising:
activating an illumination element of the computing device in response to analyzing the intensity data.

20. A non-transitory computer-readable storage medium including instructions that, when executed by at least one processor of a computing device, cause the computing device to:
capture, using a light sensor of a camera module of the computing device, intensity data regarding an amount of ambient light proximate the camera module;

analyze, using a first processor of the camera module, the intensity data to determine an initial exposure setting for a camera of the camera module;

activate the camera;

cause the camera to capture an image using the initial exposure setting;

determine at least one image parameter value for the image;

determine that the at least one image parameter value is outside an allowable range; and determine updated intensity data.

21. The non-transitory computer-readable storage medium of claim 20, wherein the instructions when executed further cause the computing device to:

provide data for the image to a second processor of the computing device;

determine one or more image quality values from the data; and generate an updated exposure setting when at least one of the one or more image quality values falls outside an acceptable range.

22. The non-transitory computer-readable storage medium of claim 20, wherein the instructions when executed further cause the computing device to:

activate an illumination element of the computing device to cause the at least one image parameter value to be within an allowable range of values.

* * * * *